(12) United States Patent
Takano (10) Patent No.: US 7,038,336 B2
(45) Date of Patent: May 2, 2006

(54) CONSTRUCTION OF POWER ASSISTING SYNCHRONOUS MOTOR

(75) Inventor: Tadashi Takano, Shuuchi-gun (JP)

(73) Assignee: Kabushiki Kaisha Moric, Mori-machi (JP)

( * ) Notice: Subject to any disclaimer, the term of this patent is extended or adjusted under 35 U.S.C. 154(b) by 395 days.

(21) Appl. No.: 10/707,349

(22) Filed: Dec. 8, 2003

(65) Prior Publication Data

US 2004/0119345 A1    Jun. 24, 2004

(30) Foreign Application Priority Data

Dec. 19, 2002   (JP)   .............................. 2002-368079

(51) Int. Cl.
H02K 1/04 (2006.01)
(52) U.S. Cl. ............................ 310/43; 310/71; 310/254
(58) Field of Classification Search ................. 310/43, 310/45, 71, 68 B, 254, 258, 259
See application file for complete search history.

(56) References Cited

U.S. PATENT DOCUMENTS

| | | | | |
|---|---|---|---|---|
| 1,584,502 A * | 5/1926 | Apple | ................... | 310/258 |
| 2,922,902 A * | 1/1960 | Hargreaves | ................... | 310/43 |
| 2,944,297 A * | 7/1960 | Maynard | ................... | 29/596 |
| 3,210,577 A * | 10/1965 | Hogue | ................... | 310/43 |
| 3,873,861 A * | 3/1975 | Halm | ................... | 310/43 |
| 4,437,027 A * | 3/1984 | Yamamoto et al. | ................... | 310/78 |
| 4,456,844 A * | 6/1984 | Yamamoto et al. | ................... | 310/87 |
| 4,496,866 A * | 1/1985 | Yamamoto et al. | ................... | 310/87 |
| 4,549,105 A * | 10/1985 | Yamamoto et al. | ................... | 310/87 |
| 4,908,534 A * | 3/1990 | Gubler et al. | ................... | 310/45 |
| 4,982,125 A * | 1/1991 | Shirakawa | ................... | 310/88 |
| 5,073,735 A * | 12/1991 | Takagi | ................... | 310/71 |
| 5,239,218 A * | 8/1993 | Hashimoto et al. | ................... | 310/68 B |
| 5,369,322 A * | 11/1994 | Maruyama et al. | ................... | 310/39 |
| 5,532,533 A * | 7/1996 | Mizutani | ................... | 310/68 B |
| 5,806,169 A * | 9/1998 | Trago et al. | ................... | 29/596 |
| 5,864,192 A * | 1/1999 | Nagate et al. | ................... | 310/156.05 |
| 5,877,574 A * | 3/1999 | Molnar | ................... | 310/215 |
| 5,955,807 A * | 9/1999 | Kajiura et al. | ................... | 310/156.66 |
| 5,977,671 A * | 11/1999 | Kim | ................... | 310/89 |
| 6,011,339 A * | 1/2000 | Kawakami | ................... | 310/208 |
| 6,081,056 A * | 6/2000 | Takagi et al. | ................... | 310/89 |
| 6,111,333 A * | 8/2000 | Takahashi et al. | ................... | 310/90.5 |
| 6,163,097 A * | 12/2000 | Smith et al. | ................... | 310/261 |
| 6,359,353 B1 * | 3/2002 | Bevington | ................... | 310/87 |
| 6,583,532 B1 * | 6/2003 | Hein et al. | ................... | 310/260 |
| 6,680,553 B1 * | 1/2004 | Takano | ................... | 310/68 B |
| 6,700,253 B1 * | 3/2004 | Ohnuma et al. | ................... | 310/89 |

FOREIGN PATENT DOCUMENTS

JP    06-233483    8/1994

* cited by examiner

*Primary Examiner*—Dang Le
(74) *Attorney, Agent, or Firm*—Ernest A. Beutler

(57) ABSTRACT

An improved synchronous electric motor incorporating a stator and large current terminal unit made into a single unit with solidified molding resin thus a separate casing is unnecessary and thus the constitution is simplified. The large current terminal unit and a magnetic pole position detector are located on opposite sides of the stator, with the former mounted on one end of the shaft of a cooperating rotor and with the other on the other end of the rotor shaft, and they are fixed in solidified molding resin to form a single body.

9 Claims, 7 Drawing Sheets

FIG. 8

CONSTRUCTION OF POWER ASSISTING SYNCHRONOUS MOTOR

BACKGROUND OF INVENTION

This invention relates to a synchronous electric motor particularly adapted to supply large power output while maintaining a compact and highly effective construction.

As is well known synchronous motors normally have a rotor and a cooperating stator. The stator comprises coils wound around the respective pole teeth of a stator core. These coils are electrically interconnected in a coil terminal circuit formed on a printed circuit board. A rotation position detector is also provided to detect the rotation angle of the rotor relative to the stator. In household electric appliances, the coil current is usually in the order of several amperes and the coil wire diameter is about 0.3 to 0.6 mm. Various rotation position detector are used such as Hall elements or electric or optical encoders.

There are however other applications for this type of motor that require much greater power output. For example, power assisting synchronous motors are used in the power steering of motor vehicles and/ or in power assisted vehicles such as bicycles, wheelchairs and the like. These applications require a high output and as a result a large current of 20 amperes or more flows through the coils. The coil wire diameter may be about 1 mm or even greater and the coil temperature can rise to as high as about 180 degrees C. in addition, the temperature range over which they operate can vary greatly.

As an example, the coil temperature of a power assisting motor for use such as in the power steering of motor vehicles frequently ranges from −40 to 150 degrees C. and in many instances even greater ranges. Therefore, it is not possible to use a synchronous motor of the same constitution as that of the synchronous motors intended for use in the household electric appliances and specifically using a rotation position detector on which electronic components are mounted. In addition the large currents required cannot be processed simply with coil terminals on a printed circuit board.

A typical prior art construction for higher output motors is shown and described in Japanese patent publication JP-A-Hei06-233483. In this construction the coil windings are connected in phases through conducting members of like ring shape placed one over another for each phase with electrical isolation between them. This assembly is then fixed as a unit at an end surface of the stator. This provides a large current terminal circuit to connect the coil ends.

However with this type of construction the overall assembly the construction becomes complicated and expensive to manufacture. This is because the stator must first be placed in and fixed to a separate casing. Then a separate magnetic pole position detector must be installed and wired. As a result, the overall constitution becomes complicated, the size increases, handling is cumbersome, and assembly and maintenance become more difficult.

It is therefore a principle object of the invention to provide a high power output synchronous motor of a small size, with improved ease of handling, and with compact constitution. It is a further object to provide a single compact unit including a large current terminal circuit and a magnetic pole position detector.

SUMMARY OF INVENTION

The invention is adapted to be embodied in a high power synchronous electric motor comprised of a rotor having a rotor shaft carrying a plurality of circumferentially spaced permanent magnets. A stator encircles the rotor and is comprised of a plurality of poles around which coil windings are formed. A high capacity terminal circuit is positioned at one axial end of the poles in circuit with the coil windings. A magnetic detector is positioned at the other axial end of the poles and cooperates with permanent magnets for determining the rotational position of the rotor. Finally, a resinous body encases the poles, the windings, and the high capacity terminal circuit to form a single unit.

DETAILED DESCRIPTION

Figure 1:
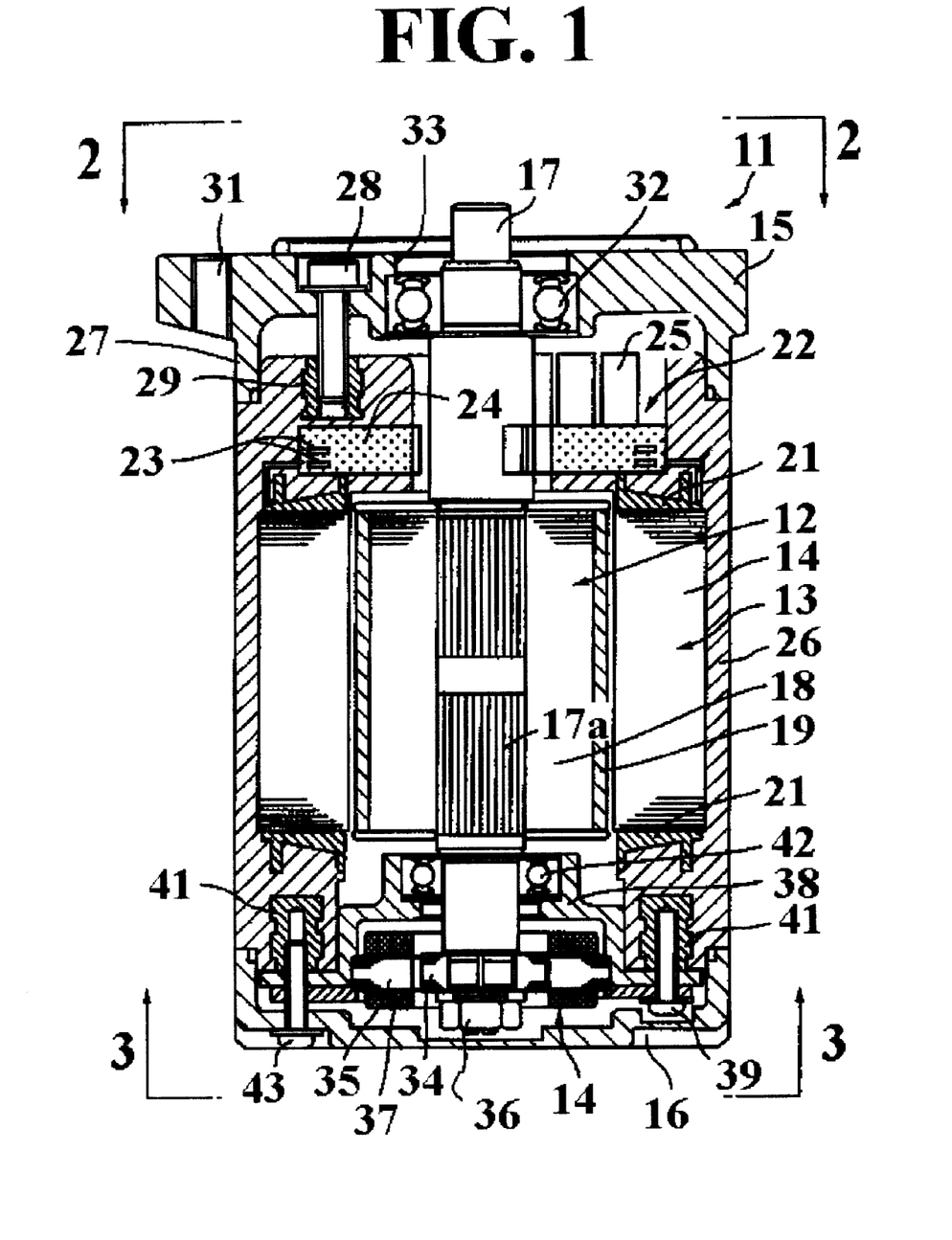
FIG. 1 is a cross sectional view of a synchronous electric motor constructed in accordance with an embodiment of the invention and taken generally along the rotational axis of the motor, although the rotor shaft is not shown in section.

Referring now in detail to the drawings and initially to FIG. 1, an electric motor constructed in accordance with an embodiment of the invention is indicated generally at 11. The motor 11 comprises a 3-phase, DC brushless motor consisting of a rotor 12, a stator 13, a magnetic pole detector 14, an upper cover or end closure 15, and a lower cover or end closure 16. The rotor 12 is comprised of a rotor shaft 17 to which a rotor core 18 non-rotably fixed in a suitable manner such as by a serration 17a. A plurality of magnets 19 having alternating polarities are suitably attached to the outer surface of the rotor core 18 by adhesion (SPM) or embedding near the surface (IPM).The stator 13 is comprised of a stator core 14 forming a plurality of magnetic pole teeth in any desired number, such as 12, 16, 18, facing the magnets 19 of the rotor 12. Insulating bobbins 21 are positioned around these pole teeth from above and under, as seen in the drawing, into slots formed between the respective magnetic pole teeth of the stator core 14. Coils (not shown) for accommodating a large amperage at a low voltage (such as 20 A or more at 12 V) are wound around the upper and lower insulators 21. The coil wire diameter is about 1 mm or greater. A large, current terminal circuit unit indicated generally at 22 is placed at one end the stator 13, the upper end as shown in the illustrated embodiment. Since the winding of the coils is arranged in three phases" the large current terminal circuit unit 22 is made up of three conducting rings 23 (only two of which are shown in the drawing). The rings 23 are placed in spaced relation one over another corresponding to three phases of U, V, and W. The rings are insulated from each other in fixed by a molding resin 24. The rings 23 are formed with coil connecting terminals corresponding in number to the magnetic poles provided around their circumference. These coil connecting terminals are connected by soldering to wire end portions (not shown) bent outward of the insulator 21 on the upper one of coil end portions (portions projecting up and down from the stator core 14) of the stator 13. The respective coil connecting terminals 25 are connected through the conducting rings 23 to external connecting terminals 25.

The large current terminal circuit unit 22 and the stator 13 are joined or potted together by a molding resin 26 to form a single body. The material for the molding resin 26 may be, for example, a premix of unsaturated polyester resin having chemical resistance and stable properties over a wide range of temperatures (from about −0 to 200 degrees C.). The premix is a putty-like forming material made of liquid low-profile thermoplastic resin (unsaturated polyester resin) kneaded with additives such as reinforcing agent, filler, catalyst, coloring agent, and parting agent. As the reinforcing agent may be used glass fiber, or vinylon fiber. As the filler may be used calcium carbonate or aluminum hydroxide. As the curing catalyst may be used organic peroxide. As the parting agent may be used zinc stearate.

Figure 2:
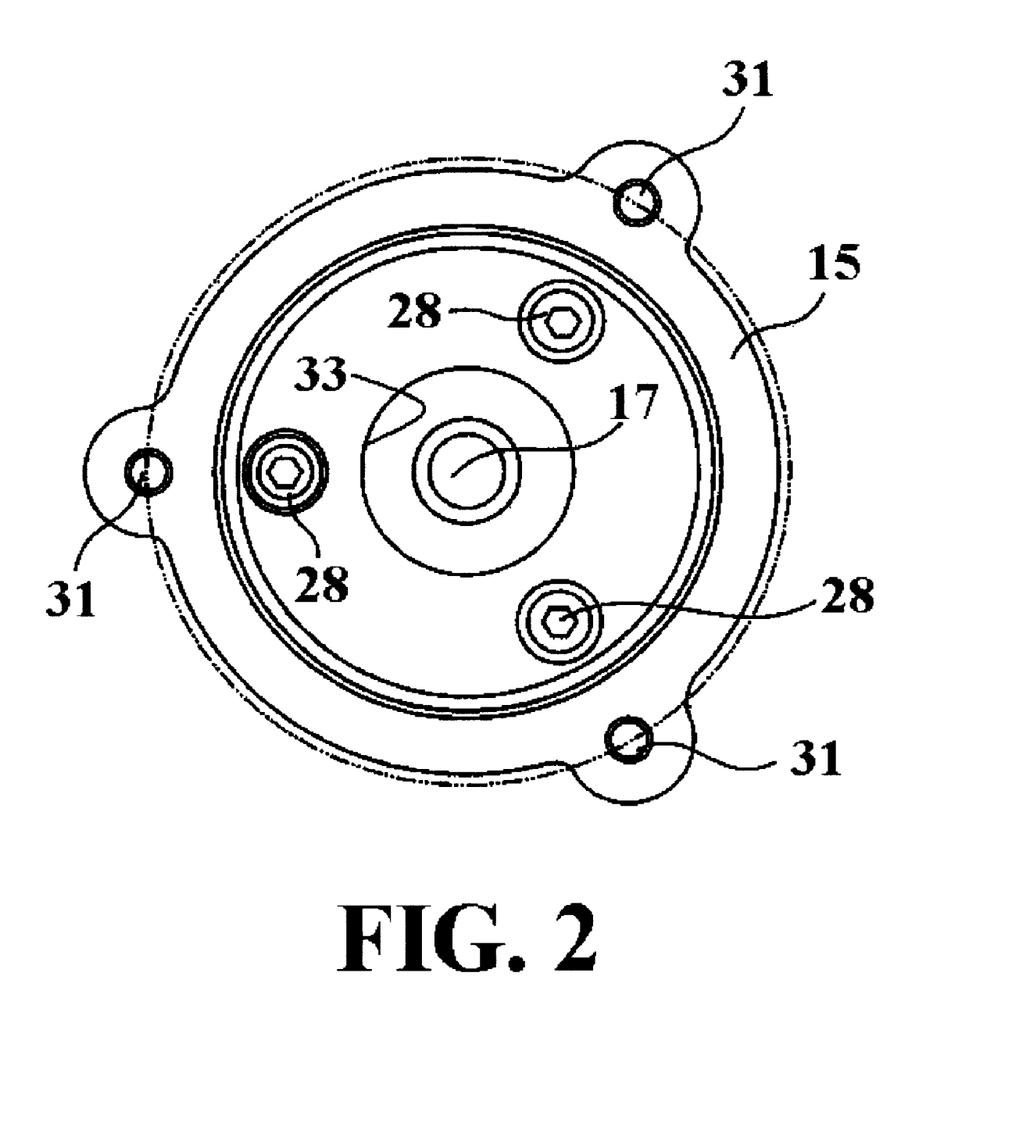
FIG. 2 is an end view looking in the direction of the line 2—2 in FIG. 1.

The goals achieved by making the stator 13 of the motor 11 as a single body with the molding resin 26 as described above are: (1) restricting noise and vibration, (2) preventing the rotor and the stator from interfering with each other and increasing insulation due to completely embedded coil wires, (3) perfect waterproofing and corrosion-proofing, and (4) increased thermal capacity serving to alleviate thermal effect to the outside in the case of sudden temperature rise, substantially with a high heat radiation property that is almost as high as that of The upper cover 15 has a flange portion 27 that fits to a peripheral recess the molding resin 26 on the upper side of the large current terminal circuit unit 22. As shown best in FIG. 2, the upper cover 15 is secured by screwing three bolts 28 into insert nuts 29 (FIG. 1) embedded into the molding resin 26. To provide for mounting of the motor 11 the upper cover 15 is provided with three mounting holes 31 provided on the peripheral flange.

The upper cover 15 also supports the upper end of the rotor shaft 17 for rotation through an anti-friction bearing 32 carried thereby adjacent an opening 33 through which the upper, driving end of the rotor shaft 17 passes for driving arrangement with an associated load, as will be described later by reference to FIGS. 7 and 8.

The magnetic position detector (resolver) 14 is provided below the rotor core 18 on the bottom end of the rotor shaft 17. The magnetic position detector 14 is made up of a rotary magnetic pole member 34 and a stationary magnetic pole member 35 placed there around in confronting relationship. The rotary magnetic pole member 34 is made up of laminated steel sheets having a plurality of teeth non-rotatably fixed not to the rotor shaft 17 using a key or the like (not shown) and held axially thereon by a nut 36.

The stationary magnetic pole member 35 made up of laminated steel sheets is placed around the rotary magnetic pole member 34 with teeth confronting those of the member 34. Coils 37 are wound around the teeth of the stationary magnetic pole member 35. The rotation position of the rotor 12 relative to the stator 13 is detected by detecting changes in the magnetic flux for the stationary magnetic pole member 35 using the coils 37 as the rotor shaft 17 rotates.

Figure 3:
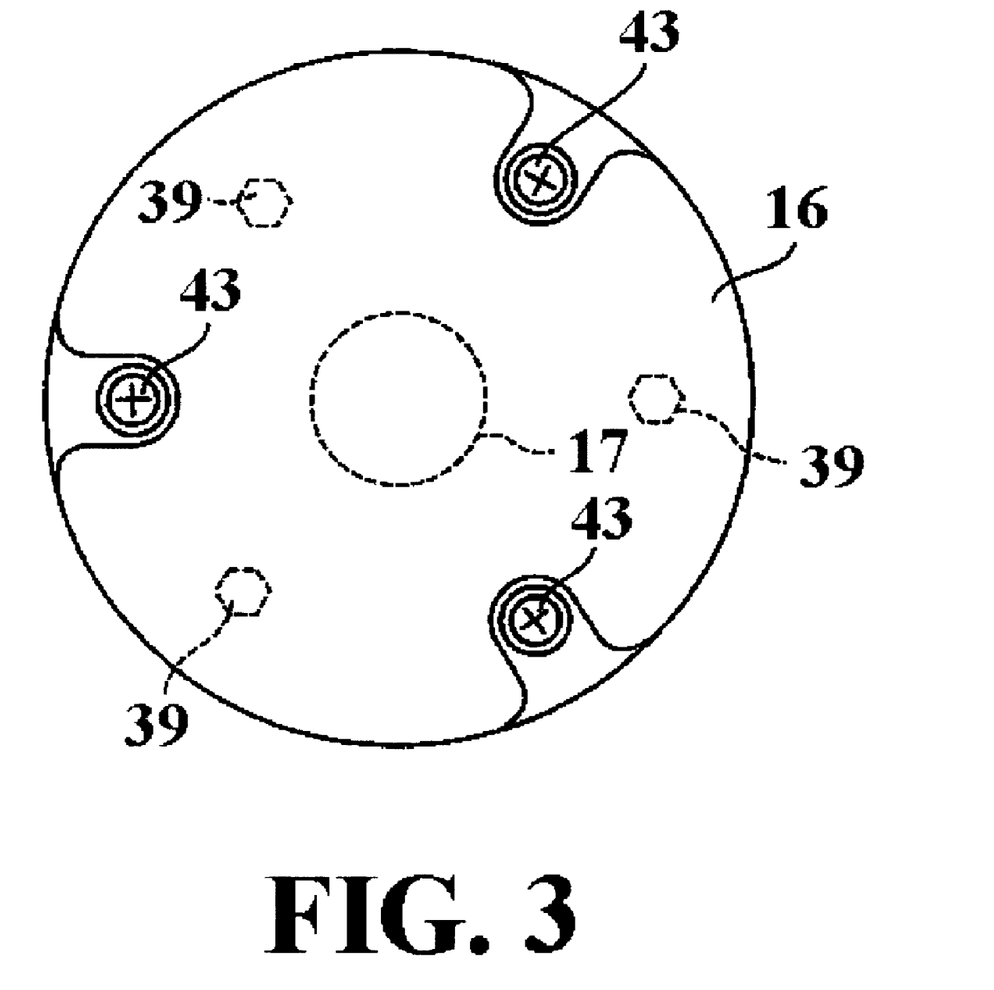
FIG. 3 is an opposite end view looking in the direction of the line 3—3 in FIG. 1.

The stationary magnetic pole member 35 is held with a lower end closure 38 made of steel, for example. This end closure 38 is fixed to the remainder of the stator assembly 13 by three bolts 39 (See FIGS. 1 and 3) screwed into insert nuts 41 embedded in the molding resin 26. The end closure 38 also supports the bottom end of the rotor shaft 17 for rotation by means of an anti-friction bearing 42, thus simplifying and making the assembly more compact.

Figure 4:
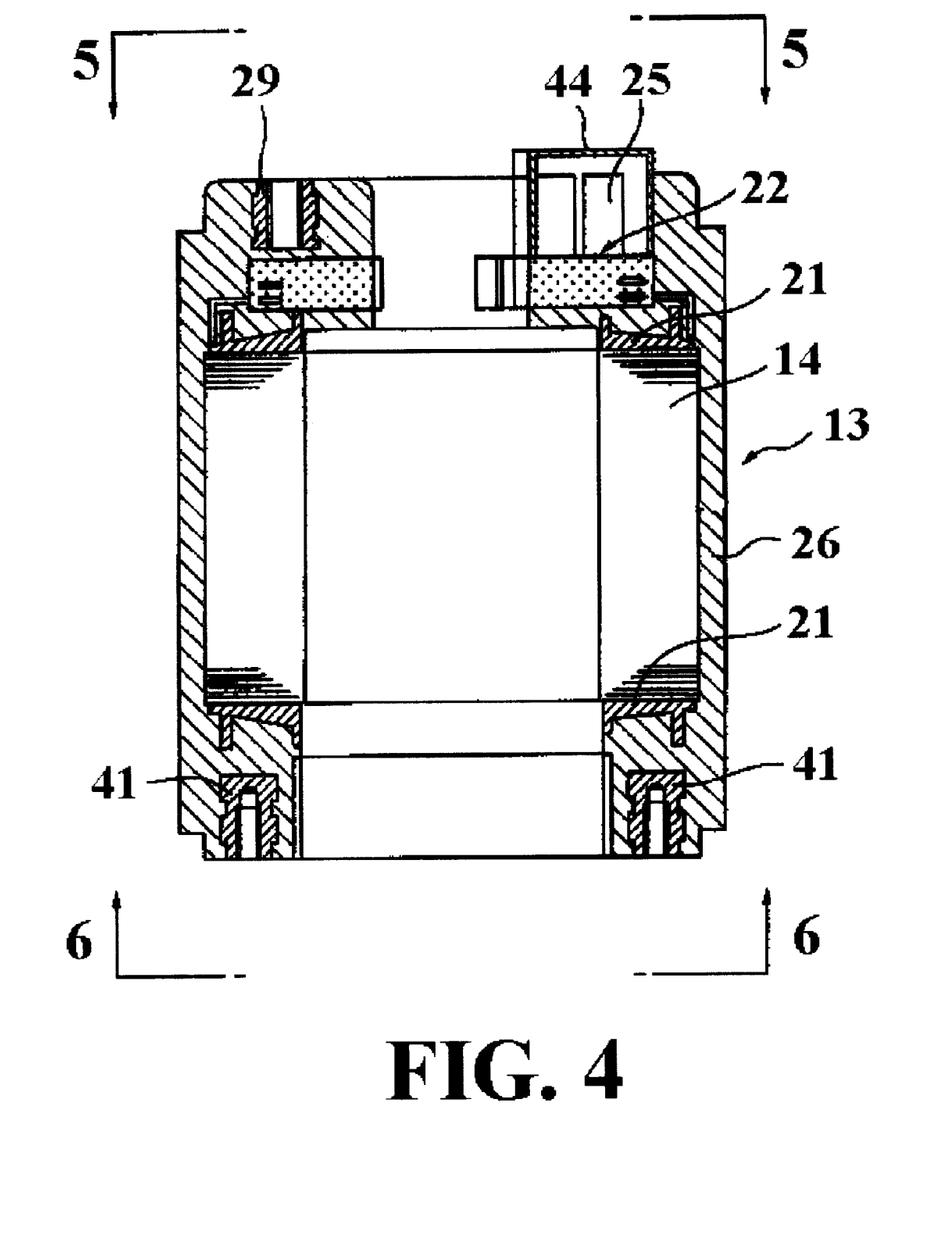
FIG. 4 is a cross sectional view of in part similar to FIG. 1, but showing only the stator.
Figure 5:
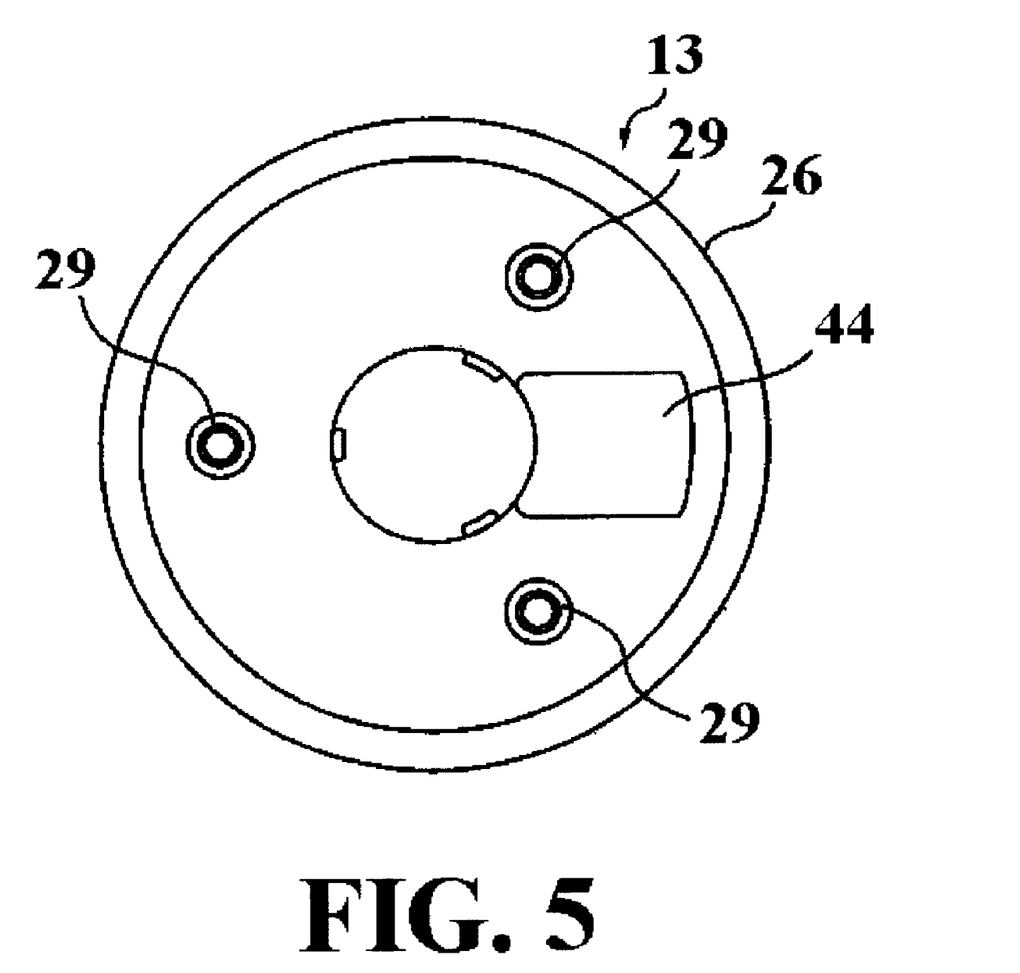
FIG. 5 is an end view looking in the direction of the line 5—5 in FIG. 4.
Figure 6:
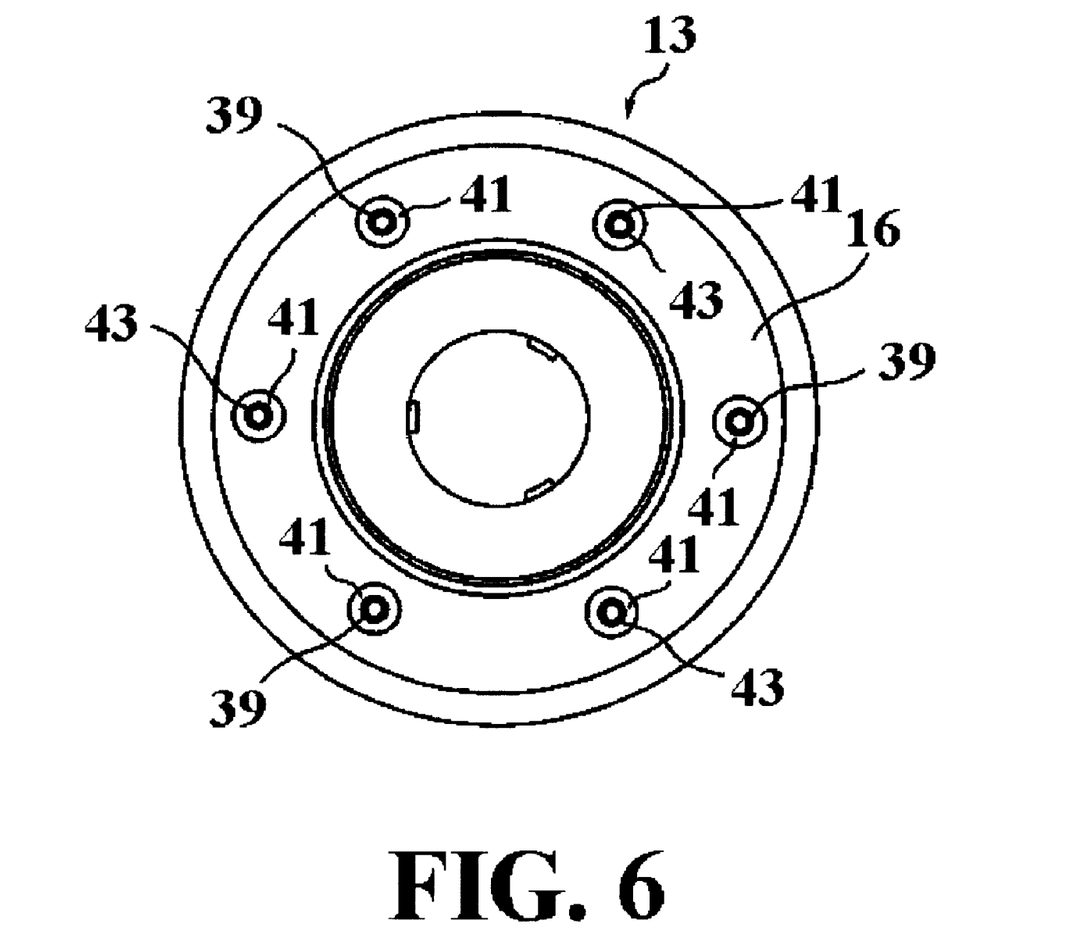
FIG. 6 is an opposite end view looking in the direction of the line 6—6 in FIG. 4.

The under cover 16 is fitted to the bottom end surface of the molding resin 26 so as to cover the magnetic pole position detector 14, and retained by three bolts 43 (See FIGS. 1 and 3) screwed into additional insert nuts 41. These bolts 43 also assist in retaining the closure member 38 to the stator assembly 13 Referring now to FIG. 4, when the molding of the resin 26 is done, the external connecting terminal 25 of the large current terminal circuit unit 22 covered with a cap 44. After the resin solidifies, the cap 44 is removed, and the rotor shaft and others are installed to make the DC brushless motor 11 shown in FIG. 1. Three insert nuts 29 are embedded in the upper side of the molding resin 26 (FIG. 5), and six insert nuts 41 are embedded in the lower side (FIG. 6).

Having thus described the construction and advantages of the motor 11, two specific examples of its potential use will be described by reference to FIGS. 7 and 8, each of which is a block diagram showing respective application examples of the present invention.

Figure 7:
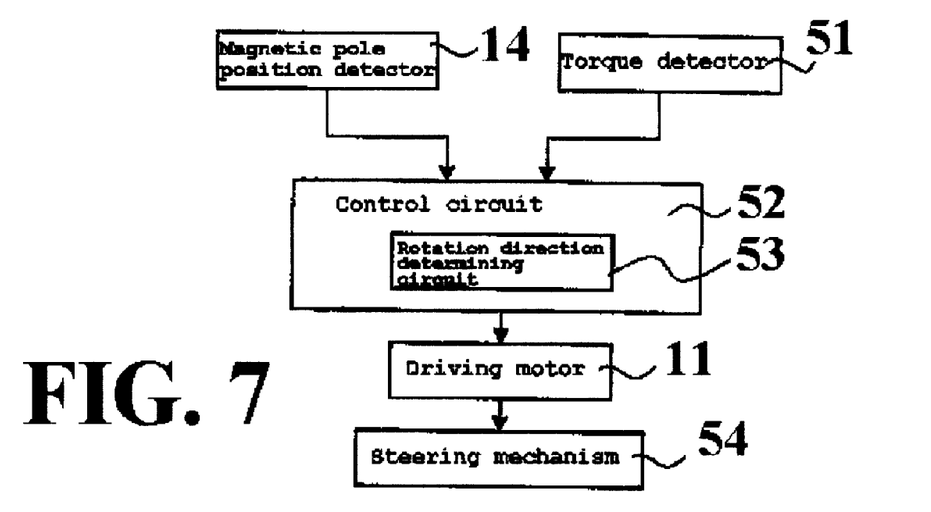
FIG. 7 is a block diagram showing how a motor constructed in accordance with the invention can be utilized in a power assisted vehicle steering system.

Referring first to FIG. 7, this shows an example of applying the invention to a power steering system of a vehicle such as an automobile. The rotation position of the steering is detected with the magnetic pole position detector 14. A torque detector 51 detects the torque applied by an operator for rotating the steering. These two detected signals are inputted to a control circuit indicated schematically at 52. The control circuit 52 has a rotation direction determining circuit 53 for detecting the rotating direction of the steering. The rotation direction determining circuit 53 determines clockwise or counterclockwise direction depending on the order of the inputted signal, UVW or UWV. The driving motor 11 made up of the DC brushless motor of the present invention is driven according to the rotation direction and the torque. The driving motor 11 is connected through a speed reduction mechanism to the pinion shaft of a rack and pinion mechanism 54, for example, of a steering mechanism, and drives the rack to apply rotation force to the steering.

Figure 8:
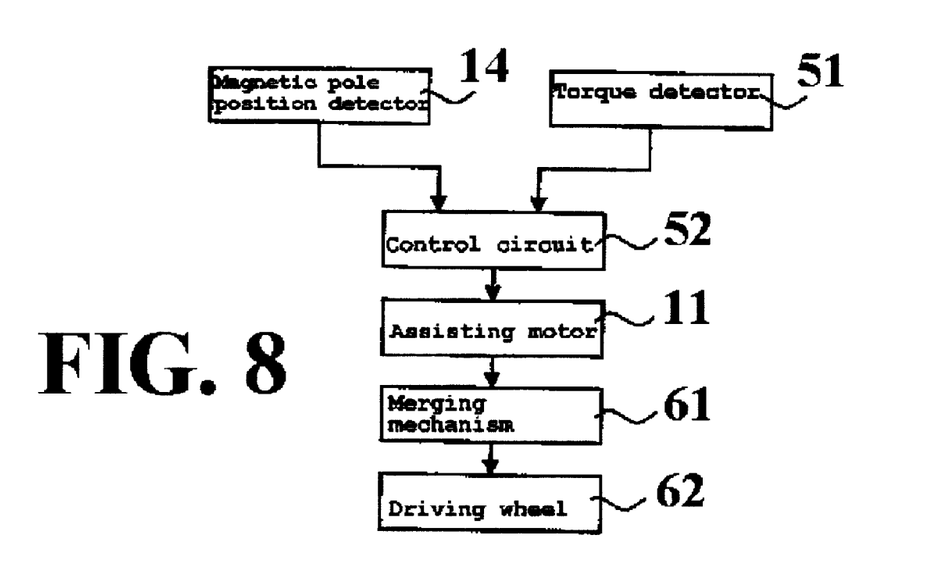
FIG. 8 is a block diagram showing how a motor constructed in accordance with the invention can be utilized in a power assisted wheeled vehicle.

FIG. 8 shows an example of applying the present invention to a power assisted vehicle such as a bicycle. Like the example shown in the FIG. 7, the magnetic pole position detector 14 and the torque detector 51 are connected to the control circuit 52. The arrangement according to this embodiment requires no rotation direction determining circuit 52, as rotation force is always applied in one direction (forward direction). The control circuit 52 drives the assisting motor 11 made up of the DC brushless motor of the invention according to the pedaling force detected with the torque detector 51 with assist driving force of a specified assist ratio. The assisting motor 11 is connected through a speed reduction mechanism or a planetary gear mechanism to a transmission merging mechanism 61 built in a pedal crankshaft to produce resultant force together with the pedaling force. The resultant force made up of the rotation force of the assisting motor 36 and the pedaling force is transmitted to a driving wheel 62, by driving a chain through a sprocket, or directly through a shaft drive, to apply rotation assisting force.

From the foregoing description, it should be obvious that since the stator and the large current terminal unit are made into a single unit with solidified molding resin, a separate casing is unnecessary and thus the constitution is simplified. The large current terminal unit and the magnetic pole position detector are located on opposite sides of the stator, with the former mounted on one end of the rotor shaft and with the other on the other end of the rotor shaft. As a result, the power assisting synchronous motor completed is well-balanced both in weight distribution and properties against thermal effect, easy to handle, and small in size because of simple constitution. Of course, however, those skilled in the art will readily understand that the foregoing description is of preferred embodiments and various changes and modifications may be made without deviating from the spirit and scope of the invention, as defined by the appended claims.

The invention claimed is:

1. A high power synchronous electric motor comprised of a rotor having a rotor shaft carrying a plurality of circumferentially spaced permanent magnets, a stator encircling said rotor and comprised of a plurality of poles around which coil windings are formed, a high capacity terminal circuit positioned at one axial end of said poles in circuit with said coil windings, a magnet detector positioned at the other axial end of said poles and cooperating with said permanent magnets for determining the rotational position of said rotor, and a resinous body encasing said poles, said windings, and said high capacity terminal circuit to form a single unit and end closures carrying bearings for journaling opposite ends of said rotor shaft directly and detachably fixed to said resinous body.

2. A high power synchronous electric motor as set forth in claim 1, wherein the end closures are affixed to the resinous body by threaded fasteners threaded into inserts retained in said resinous body.

3. A high power synchronous electric motor as set forth in claim 1, wherein the magnet detector includes a sensor element fixed to the other end of the resinous body.

4. A high power synchronous electric motor as set forth in claim 3, wherein the sensor element of the magnet detector is carried by the end closure at the respective end of the rotor shaft.

5. A high power synchronous electric motor as set forth in claim 4, wherein the end closures are affixed to the resinous body by threaded fasteners threaded into inserts retained in said resinous body.

6. A high power synchronous electric motor as set forth in claim 5, further including an end cap affixed to the resinous body and enclosing the end closure carrying the sensor element of the magnet detector.

7. A high power synchronous electric motor as set forth in claim 1, wherein the high capacity terminal circuit is comprised of a plurality of ring shaped sheets surrounding the rotor shaft each having connections to a plurality of the coil windings and being axially spaced from each other and imbedded in an insulating material.

8. A high power synchronous electric motor as set forth in claim 7, herein the insulating material is embedded in the resinous body.

9. A high power synchronous electric motor as set forth in claim 8, wherein each of the ring shaped sheets has at least one axially extending terminal penetrating through the insulating material to accommodate an external electrical connection.

* * * * *